(12) United States Patent
Martin et al.

(10) Patent No.: US 9,094,328 B2
(45) Date of Patent: Jul. 28, 2015

(54) TOPOLOGY FOR LARGE PORT COUNT SWITCH

(71) Applicant: Brocade Communications Systems, Inc., San Jose, CA (US)

(72) Inventors: Kreg A. Martin, Los Gatos, CA (US); David C. Banks, Pleasanton, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 14/332,952

(22) Filed: Jul. 16, 2014

(65) Prior Publication Data

US 2014/0328351 A1 Nov. 6, 2014

Related U.S. Application Data

(63) Continuation of application No. 09/972,047, filed on Oct. 5, 2001, now abandoned.

(60) Provisional application No. 60/286,399, filed on Apr. 24, 2001.

(51) Int. Cl.
*H04L 12/947* (2013.01)
*H04L 12/741* (2013.01)

(52) U.S. Cl.
CPC .............. *H04L 49/25* (2013.01); *H04L 45/745* (2013.01)

(58) Field of Classification Search
CPC ........ H04L 45/24; H04L 47/125; H04L 47/10
USPC ......................................................... 370/406
See application file for complete search history.

(56) References Cited

U.S. PATENT DOCUMENTS

| | | | |
|---|---|---|---|
| 4,736,465 | A | 4/1988 | Bobey |
| 4,875,207 | A | 10/1989 | Van Twist |
| 5,345,228 | A | 9/1994 | Franaszek |
| 5,383,181 | A | 1/1995 | Aramaki |
| 5,844,887 | A | 12/1998 | Oren |
| 6,160,813 | A | 12/2000 | Banks |
| 6,178,169 | B1 | 1/2001 | Hodgkinson |
| 6,289,021 | B1 | 9/2001 | Hesse |
| 6,529,963 | B1 | 3/2003 | Fredin |
| 2002/0034178 | A1 | 3/2002 | Schmidt |
| 2002/0141427 | A1 | 10/2002 | McAlpine |
| 2003/0093541 | A1 | 5/2003 | Lolayekar |
| 2003/0221018 | A1 | 11/2003 | Lee |
| 2005/0117562 | A1* | 6/2005 | Wrenn ........................... 370/351 |

OTHER PUBLICATIONS

"FC-SW, Rev 3.3"; T11 Committee of NCITS, Oct. 21, 1997.
Stephens, et al.; "Fibre Channel: The Basics"; ANCOT Corp.; 1995, pp. 9-1 to 10-17.
Zoltan Meggyesi; "Fibre Channel Overview"; CERN High Speed Interconnect; Aug. 1994, pp. 1-10.
Kumar Malavalli; "High Speed Fibre Channel Switching Fabric Services"; 1991, SPIE vol. 1577 High Speed Fiber Networks and Channels, pp. 216-226.

* cited by examiner

*Primary Examiner* — Melvin Marcelo
(74) *Attorney, Agent, or Firm* — Blank Rome LLP

(57) ABSTRACT

A large port count Fiber Channel switch. The large port count switch comprises multiple small switches. Inter-Switch links connect the small switches within the large port count switch. A set of routing rules governs the path data follows through the large port count switch.

9 Claims, 11 Drawing Sheets

TOPOLOGY FOR LARGE PORT COUNT SWITCH

RELATED APPLICATIONS

This application is a continuation under 35 U.S.C. §120 of Ser. No. 09/972,047, entitled "Topology for Large Port Count Switch," filed Oct. 5, 2001, which in turn claims priority under 35 U.S.C. §119(e) from U.S. Patent Application Ser. No. 60/286,399, entitled, "Topology For Large Port Count Switch," by David C. Banks and K.reg Martin, filed Apr. 24, 2001, both of which are incorporated by reference in their entirety.

BACKGROUND

A. Technical Field

This invention generally relates to network switching devices and more particularly to Fibre Channel switching devices.

B. Background of the Invention

As the result of continuous advances in technology, particularly in the area of networking, there is an increasing demand for communications bandwidth. For example, the transmission of data over a telephone company's trunk lines, the transmission of images or video over the Internet, the transfer of large amounts of data as might be required in transaction processing, and remote data backup typically all require the high speed transmission of large amounts of data. Such applications create a need for data centers to be able to quickly provide their servers with large amounts of data from data storage. As such data transfer needs become more prevalent, the demand for high bandwidth and large capacity in data storage will only increase.

Fibre Channel is a transmission medium that is well-suited to meet this increasing demand, and the Fibre Channel family of standards (developed by the American National Standards Institute (ANSI)) is one example of a standard which defines a high speed communications interface for the transfer of large amounts of data via connections between a variety of hardware devices, including devices such as personal computers, workstations, mainframes, supercomputers, and storage devices. The Fibre Channel family of standards includes FC-PH (ANSI X3.230-1994), FC-PH-Amendment 1 (ANSI X3.230-1994/AM 1-1996), FC-PH-2 (ANSI X3.297-1997), FC-PH-3 (ANSI X3.303-1998), FC-SW (ANSI NCITS 321-1998), and FC-FG (ANSI X3.289-1996), which are fully incorporated by reference. Use of Fibre Channel is proliferating in many applications, particularly client/server applications that demand high bandwidth and low latency I/O. Examples of such applications include mass storage, medical and scientific imaging, multimedia communications, transaction processing, distributed computing and distributed database processing applications.

In one aspect of the Fibre Channel standard, communication between devices occurs through one or more Fibre Channel switches. With Fibre Channel switches having large port counts, congestion can result when large amounts of data can pass through the switch. If congestion occurs within the Fibre Channel switch, communication slows and performance suffers.

Accordingly it is desirable to provide a large port count switch with little congestion.

SUMMARY OF THE INVENTION

The present invention is a large port count Fibre Channel switch. The large port count switch includes a plurality of small switches. Each small switch includes a memory that stores a routing table, a central processing unit, and a plurality of ports.

In one embodiment, there are sixteen small switches arranged in four rows and four columns. Each small switch in a row is connected to every other small switch in that row by two Inter-Switch links ("ISL"s), and each small switch in a column is connected to every other small switch in that column by two ISLs. Each small switch has four ports that are connectable to external devices. When data travels from an external source device to an external destination device, the data first enters a first small switch from the external source device. Based on the destination of the data and the routing table, the first small switch first sends the data to a second small switch in the same row over the two ISLs. Based on the destination of the data and the routing table, the second small switch sends the data to a third small switch in the same column over the two ISLs. The third small switch is connected to the external destination device. Finally, based on the destination of the data and the routing table, the third small switch sends the data out the correct port to reach the external destination device.

In another embodiment, there are thirty-two small switches arranged in four rows and eight columns. Each small switch in a row is connected to every other small switch in that row by one ISL, and each small switch in a column is connected to every other small switch in that column by one ISL. Each small switch has four ports that are connectable to external devices.

When data travels from an external source device to an external destination device, the data first enters a first small switch from the external source device. Based on the destination of the data and the routing table, the first small switch first sends the data to a second small switch in the same row over the ISL. Based on the destination of the data and the routing table, the second small switch sends the data to a third small switch in the same column over the ISL. The third small switch is connected to the external destination device. Finally, based on the destination of the data and the routing table, the third small switch sends the data out the correct port to reach the external destination device.

DETAILED DESCRIPTION OF PREFERRED EMBODIMENTS

64-Port Switch, Non-Blocking at 1 Gbps

Figure 1A:
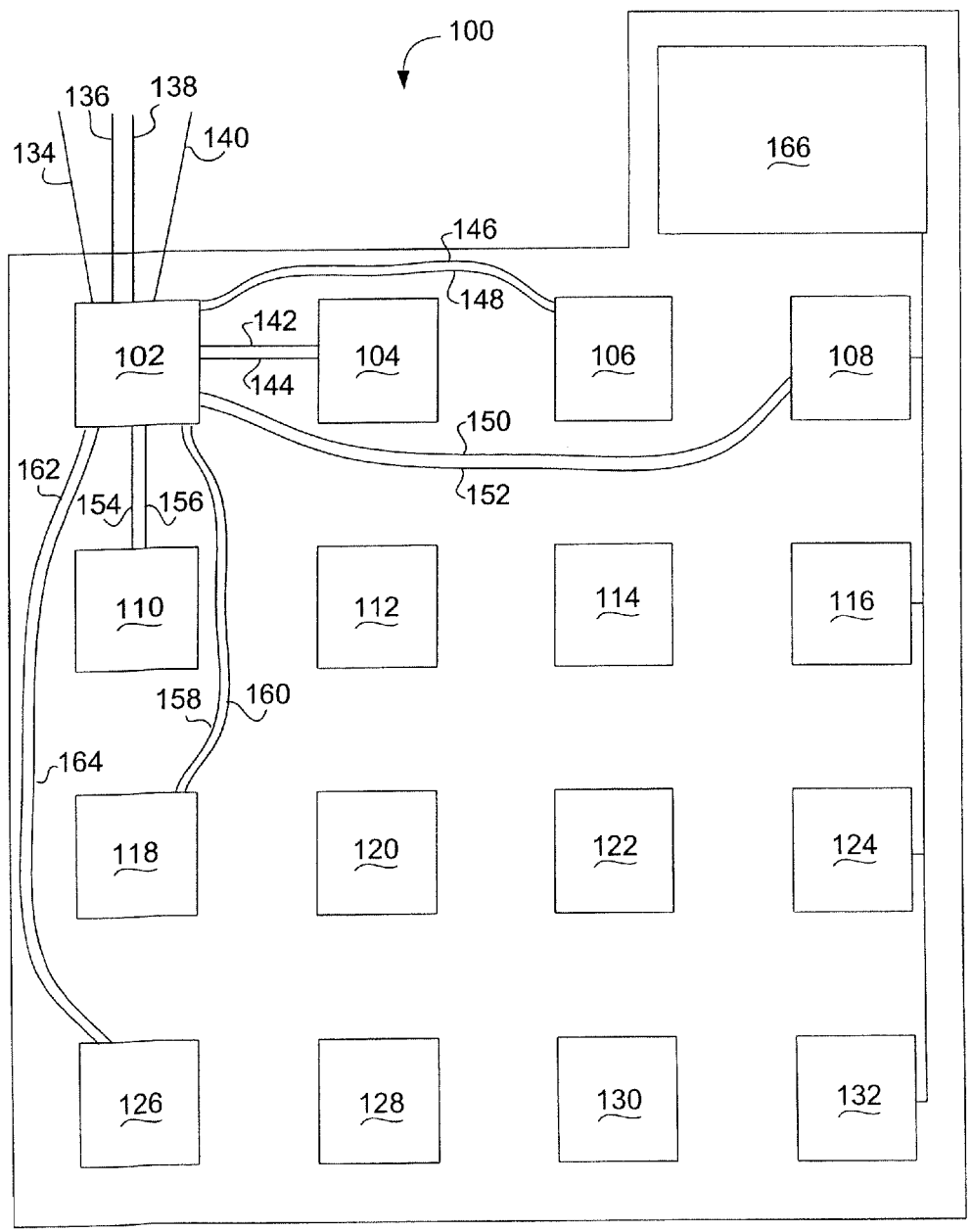
FIG. 1(a) is a block diagram of a 64-port switch in accordance with the present invention.

FIG. 1(a) is a block diagram of a 64-port switch 100 in accordance with the present invention. The 64-port switch 100 comprises sixteen small 16-port switches 102-132 and a processor 166 that is connected to and communicates with each of the small switches 102-132 (for clarity, only the connections between the processor 166 small switches 108, 116, 124, and 132 are shown). Each of the small 16-port switches 102-132 is non-blocking at 2 Gigabit per second (Gbps). In one embodiment, the 64-port switch 100 is non-blocking at input data rates of 1 Gbps.

The small switches 102-132 are arranged in four rows and four columns. Each row and column has four of the small switches. For example, the first row includes small switches 102, 104, 106, and 108. Similarly, the first column includes small switches 102, 110, 118, and 126.

The sixteen ports of the small switches 102-132 are GL_Ports. A G_Port is a port that can act as either an E_Port or an F_Port. An E_Port is a port which is communicatively coupled to another E_Port on another switch to create an Inter-Switch Link ("ISL") between switches. An F_Port is a port that connects an external device such as a single computer or storage device to a Fibre Channel switch. An "L" included in a port designation, such as in the GL_Port designation, indicates that the port has Arbitrated Loop capability. Thus, a GL_Port is a port that can act as an E_Port, an F_Port, or an FL_Port. Other Fibre Channel port types include a node port (N_Port), a node port with Arbitrated Loop capability (NL_Port), and a fabric port with Arbitrated Loop capability (FL_Port).

Each small switch 102-132 is directly connected to every other small switch in the same row through two internal ports, and is also directly connected to every other small switch in the same column through two internal ports. An internal port is a port of a small switch within the large port count switch that is connected to another small switch within the large port count switch. Thus, each small switch 102-132 has two ISLs with every other small switch in the same row and two ISLs with every other switch in the same column.

Four of the GL_Ports on each small switch 102-132 are external ports. External ports are ports to which devices external to the 64-port switch 100 may be connected. Thus, out of the 16-ports in each small switch 102-132, six ports are GL_Ports that are connected to form ISLs with the other small switches in the same row, six ports are GL_Ports that are connected to form ISLs with the other small switches in the same column, and four are GL_Ports that are available to be connected to devices external to the switch 100.

The connections and arrangement of small switch 102 illustrates how the small switches 102-132 are arranged and connected. Small switch 102 is in a row of four small switches. The other small switches in the row are small switch 104, small switch 106, and small switch 108. Two ports of small switch 102 are connected to two ports of each of the other small switches 104, 106, and 108 in the row. Two ports of small switch 102 are connected to two ports of switch 104 through ISLs 142 and 144. Two ports of small switch 102 are connected to two ports of switch 106 through ISLs 146 and 148. Two ports of small switch 102 are connected to two ports of switch 108 through ISLs 150 and 152.

Small switch 102 is also in a column of four small switches. The other small switches in the column are small switch no, small switch 118, and small switch 126. Two ports of small switch 102 are connected to two ports of each of the other small switches 110, 118, and 126 in the column. Two ports of small switch 102 are connected to two ports of switch no through ISLs 154 and 156. Two ports of small switch 102 are connected to two ports of switch 118 through ISLs 158 and 160. Two ports of small switch 102 are connected to two ports of switch 126 through ISLs 162 and 164.

Finally, four ports of small switch 102 are connectable to external devices through connections 134, 136, 138, 140.

Each of the small switches 102-132 is similarly connected to each other small switch in the same row and each other small switch in the same column (for clarity, these connections are not shown). Because there are sixteen small switches, and each small switch has four external ports, the switch 100 has sixty-four total external ports.

Generally, during normal operation, the flow of data through the 64-port switch 100 is performed by the small switches 102-132, without the processor 166 being involved.

However, the processor 166 provides other functionality. The processor 166 is capable of communicating with other switches, such as other 64-port switches 100, to perform initialization procedures. The processor 166 also provides routing tables to the small switches 102-132.

A set of routing rules controls data frames traveling through the 64-port switch 100 from an external source device (not shown in FIG. 1(a)) to an external destination device (also not shown in FIG. 1(a)). The processor 166 uses the routing rules during initiation to generate routing tables, which are stored in each small switch's 102-132 hardware. In general, the Destination ID (D_ID) in received data frames are used to retrieve from the routing table the identity of the port through which the data frame should be sent. Typically, the routing table will be different in each small switch.

The external source device and external destination device can be connected to different small switches or to the same small switch in the 64-port switch 100. The data frame enters a first small switch through one of the four externally connected ports. In one embodiment, the data frame is first sent horizontally to reach the column containing the small switch connected to the external destination device, then sent vertically within the column to reach the small switch connected to the external destination device. Under such routing rules there is only one path between any two small switches. This path is predetermined by the routing rules. Since there is only one predetermined path through the switch, the data frames are kept in order. The data frames do not follow paths through the switch that branch out and then rejoin, which could cause frame ordering problems. The following are examples of the paths of data frames through the 64-port switch 100 under such routing rules.

For a data frame entering small switch 102 from an external source device and to be sent to an external destination device connected to small switch 122, the data frame is first sent horizontally from small switch 102 to small switch 106, the horizontal "hop." The data frame is next sent vertically from small switch 106 to small switch 122, the vertical "hop." From small switch 122, the data frame is sent to the external destination device.

Similarly, for a data frame entering small switch 130 from an external source device and to be sent to an external destination device connected to small switch 120, the data frame is first sent horizontally from small switch 130 to small switch 128, the horizontal hop. The data frame is next sent vertically from small switch 128 to small switch 120, the vertical hop. From small switch 120, the data frame is sent to the external destination device.

For a data frame entering small switch 112 from an external source device and to be sent to an external destination device connected to small switch 116, the data frame is first sent horizontally from small switch 112 to small switch 116, the horizontal hop. There is no vertical hop, since the external destination device is connected to small switch 112, which is in the same row as the small switch 116 to which the external source device is connected. From small switch 116, the data frame is sent to the external destination device.

For a data frame entering small switch 108 from an external source device and to be sent to an external destination device connected to small switch 132, there is no horizontal hop. The external destination device is connected to small switch 132, which is in the same column as the small switch 108 to which the external source device is connected. The data frame is sent vertically from small switch 108 to small switch 132, the vertical hop. From small switch 132, the data frame is sent to the external destination device.

For a data frame entering small switch 122 from an external source device and to be sent to an external destination device connected to the same small switch 122, there are no hops. The data frame simply enters small switch 122 from the external source device and then is sent from small switch 122 to the external destination device.

Alternatively, the data can be sent first vertically, then horizontally through the 64-port switch 100. Other sets of routing rules can also be used, although preferably the data will travel through as few small switches as possible.

In one embodiment, each port is capable of operating at either 1 Gbps or 2 Gbps. Each of the internal ports operates at 2 Gbps. Each external port operates at either 1 Gbps or 2 Gbps, depending on the speed of the external device connected to the external port. However, the 64-port switch 100 is non-blocking at 1 Gbps.

The configuration of the 64-port switch 100 has the advantage of being non-blocking at 1 Gbps since, at most, 4 Gbps enters a small switch from the external source devices connected to that small switch. This is because the small switch has four external ports, each operating at 1 Gbps, for a maximum total input data rate of 4 Gbps. Since each small switch is connected to the other small switches in the same row by two ports and the other small switches in the same column by two ports, and each of these ports operates at 2 Gbps, the ports are capable of sending the full 4 Gbps.

Thus, for example, four external source devices are connected to small switch 102, each sending 1 Gbps of data. The data from the four external source devices is to be sent to four external destination devices, each connected to small switch 122. The full maximum data rate of 4 Gbps can be received at small switch 102 from the four external source devices and sent out from small switch 122 to the four external destination devices without congestion. The small switches themselves are non-blocking at the maximum data rate. That is, all sixteen ports of the small switch may operate at the full maximum data speed without blocking or interfering with each other. Small switch 102 receives the maximum 4 Gbps from four external source devices. The 4 Gbps of data is first sent horizontally from small switch 102 to small switch 106, the horizontal hop. Since there are two ports connecting small switches 102 and 106, each operating at 2 Gbps, the full 4 Gbps can be sent without congestion. The 4 Gbps of data is next sent vertically from small switch 106 to small switch 122, the vertical hop. Again, since there are two ports connecting small switches 106 and 122, each operating at 2 Gbps, the full 4 Gbps can be sent without congestion. From small switch 122, the 4 Gbps of data is sent to the four external destination devices.

In some embodiments, the 64-port switch 100 uses trunking and virtual channels to help prevent congestion in the ISLs. In general, trunking treats a group of ISLs, such as the pairs of ISLs connecting a small switch to every other small switch in the same row and every other small switch in the same column, as a single logical pipe. By doing so, data frames are sent as soon as possible over any available ISL in the trunked group. Thus, if one ISL in a trunked group is congested, data frames are sent over another ISL. Trunking is not limited to the 64-port switch 100, but can be used whenever multiple links connect two small switches.

Alternatively, in some embodiments, ports are associated with ISLs to avoid congestion. The ISLs can be associated with the external port through which data arrives at the 64-port switch 100, or the external port through which the data eventually leaves the 64-port switch, depending on the situation. For example, in one embodiment, two external ports at 1 Gbps are associated with each ISL. When data arrives at a small switch from an external source, the data is sent through the ISL associated with the external port through which the data arrived. When data is arrives at a small switch via an ISL, and is to be sent to another small switch via another ISL, the data is sent through an ISL associated with the external port through which the data will eventually leave the 64-port switch 100.

Virtual channels, on the other hand, allow a single physical connection to function as several different logical connections. Data flow that would congest a path between a source and destination is confined to a virtual channel within the physical path and only congests that virtual channel. The rest of the physical path is not affected by the data flow and remains uncongested and available for data traveling between another source and destination. Virtual channels can be used for general data flow. Virtual channels can also be reserved for high priority data, ensuring that the high priority data can travel through the physical path even if that path would be blocked to other general data by congestion. As with trunking, the use of virtual channels is not limited to the 64-port switch, but can be used with other embodiments as well.

The described 64-port switch further provides the advantage of allowing modular construction. Since each small switch in a row is directly connected to each other small switch in the row, a column of four small switches can be removed and the remaining small switches will still function. For example, if the third column of FIG. 1(*a*), having small switches 106, 114, 122, and 130, is removed, the 64-port switch 100 becomes a 48-port switch, but otherwise operates in the same manner. When data enters one of the remaining small switches connected to an external source device, the data still travels over a horizontal hop, if necessary, and a vertical hop, if necessary, and leaves the small switch connected to the external destination device. Essentially, instead of a switch 100 having four columns of four small switches, the switch 100 has of three columns of four small switches, but operates in the same manner.

Similarly, if a row is removed, the switch 100 then has four columns of three small switches, but operates in the same manner.

Figure 1B:
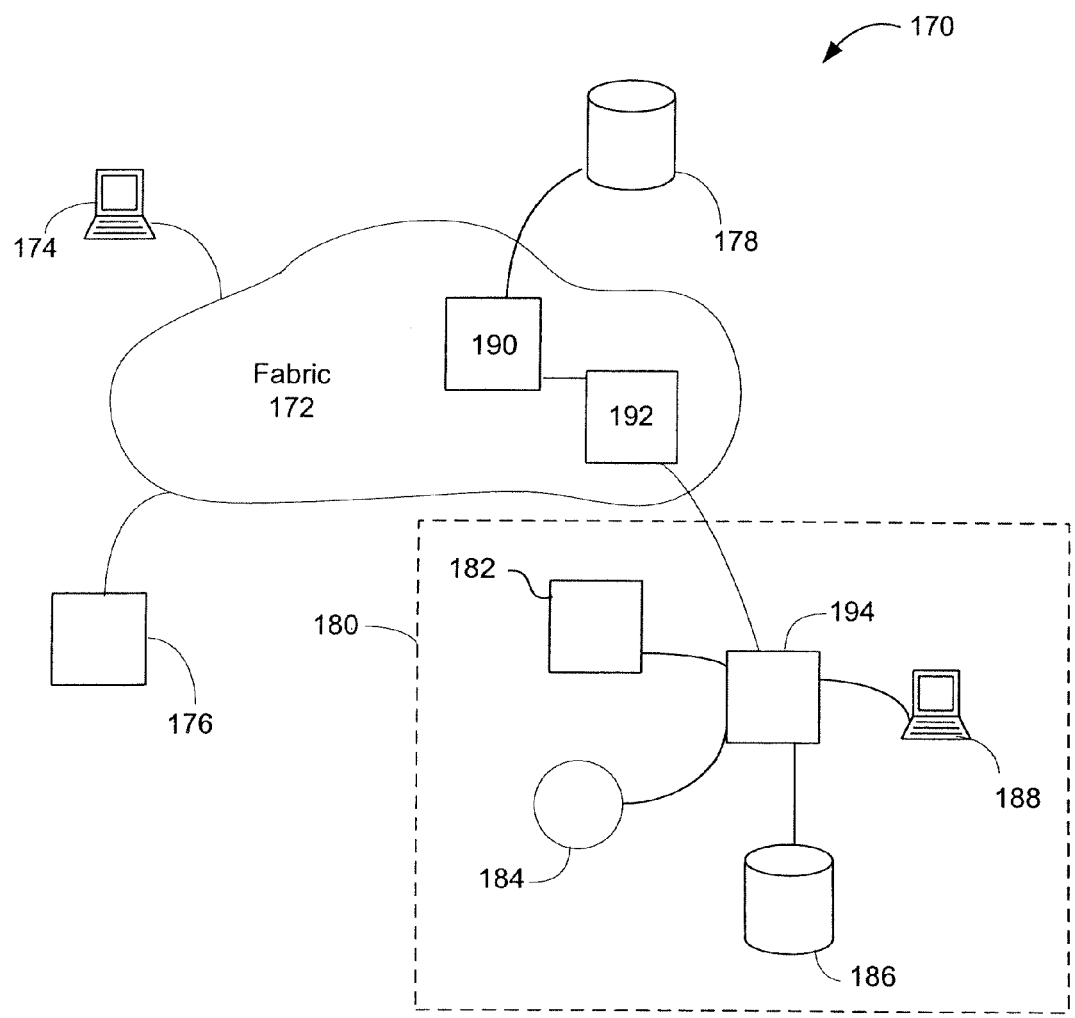
FIG. 1(b) is a block diagram of an embodiment of a Fibre Channel communication network system.

One embodiment takes advantage of the modular capabilities of the 64-port switch 100 of FIG. 1(*a*) and is constructed so that any column may be removed, and the rest of the switch 100 can operate normally. If a small switch in a column malfunctions or must be replaced, the column containing the small switch is removed and replaced. Thus, when a small switch must be replaced, only three other small switches are out of service, instead of all the other small switches in the 64-port switch 100. Since devices are typically connected to the small switches, this means that fewer devices lose connectivity to the network.

FIG. 1(*b*) is a block diagram of an embodiment of a Fibre Channel communication network system 170 that may beneficially utilize the present invention, and may contain an embodiment of the present invention. The Fibre Channel communication network system 170 comprises a fabric 172, a plurality of devices 174, 176, 178, and/or groups 180 of devices 182, 184, 186 and 188. In the communication network system 170 of FIG. 1(*b*), the group 180 is an arbitrated loop that includes devices 182, 184, 186 and 188. In general, fabric 172 is coupled to the various devices 174, 176, 178 and groups 180, and acts as a switching network to allow the devices and groups to communicate with each other. Devices 174, 176, 178 may be any type of device, such as a computer or a peripheral, and are coupled to the fabric 172 using a point-to-point topology. Fabric 172 is also in communication with loop 180. Loop 180 includes multiple devices 182, 184, 186 and 188 which help form the loop 180. The devices 182, 184, 186 and 188 in loop 180 are connected to the fabric 172 via a hub 194.

The fabric 172 includes one or more Fibre Channel switches. Some or all of these switches can be the 64-port switch 100 described above with respect to FIG. 1(*a*). If the fabric has one switch, all the devices connected to the fabric 172 are connected to that switch and communicate through the switch. If the fabric 172 includes multiple switches, the switches are connected together via their E_Ports. In the embodiment shown in FIG. 1(*b*), the fabric 172 includes switches 190 and 192. The loop 180 is connected to switch 192 via a hub 194 connected to an FL_Port in switch 192. Switch 192 is connected to switch 190 via an ISL between E-Ports of switches 190 and 192. Device 178 is connected to switch 190 via an F-Port in switch 190. When devices 182, 184, 186, 188 in the loop 180 send data frames to device 178, the data frames travel from the originating device, through the hub 194 in the loop 180, to switch 192, to switch 190, and finally to device 178. Similarly, when device 178 sends data frames to device 184, for example, the data frames travel from device 178, to switch 190 in the fabric 172, to switch 192, to the hub 194 in the loop 180, and finally to device 184.

Detail of the Small Switch

Figure 2A:
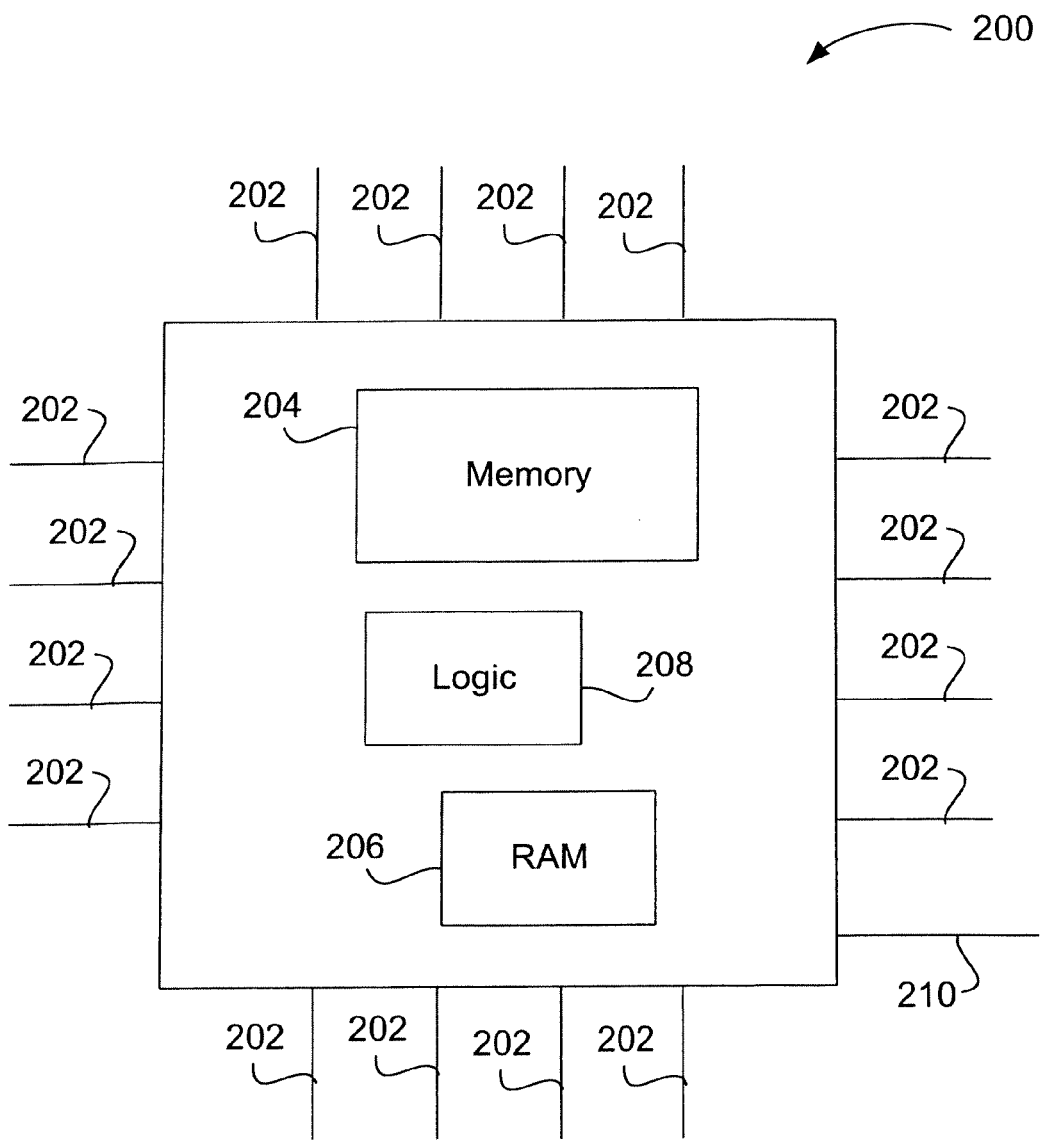
FIG. 2(a) is a block diagram of one of the small switches.
Figure 2B:
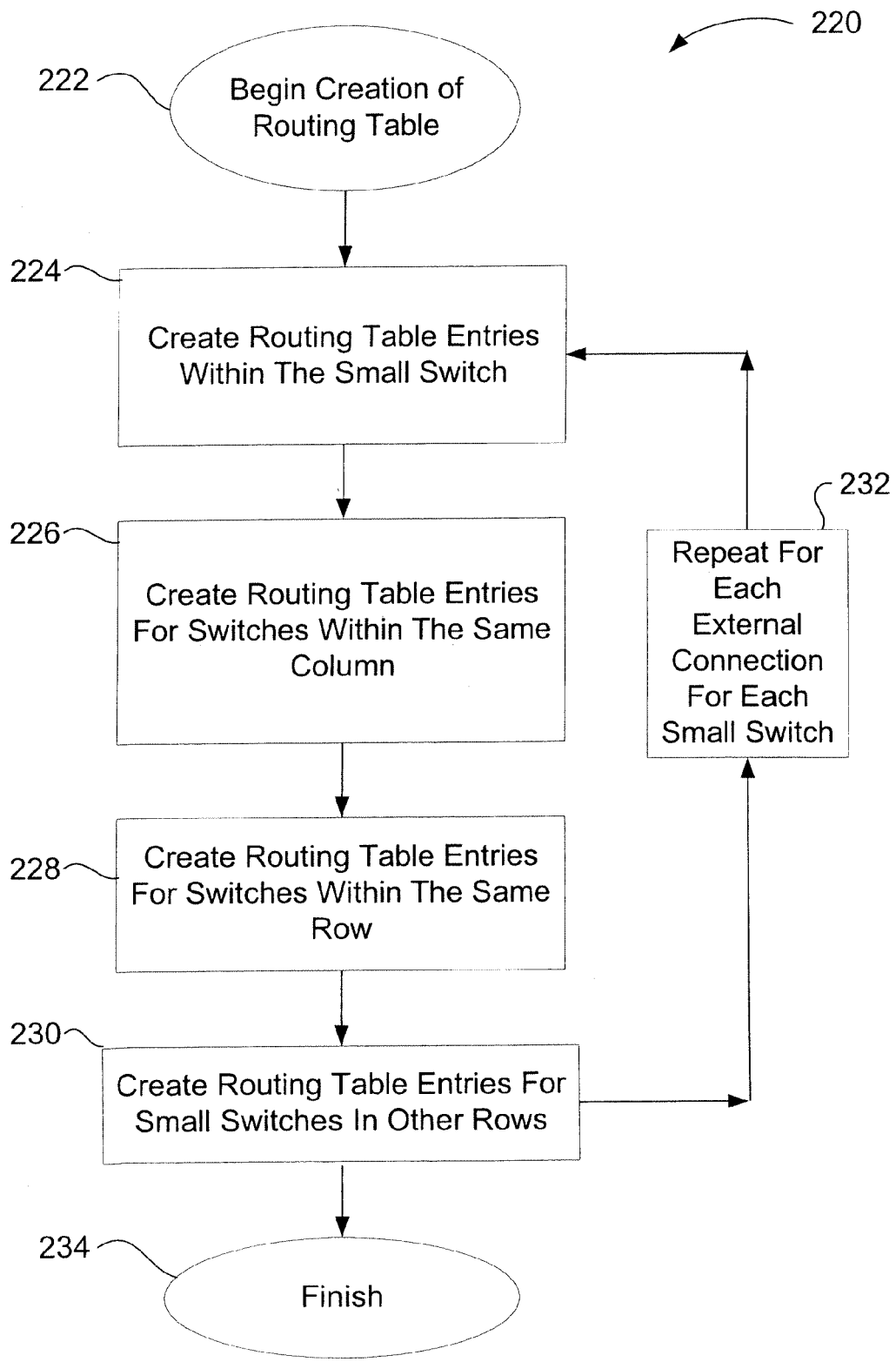
FIG. 2(b) is a flow chart illustrating an initialization process for a 64-port switch.

FIG. 2(*a*) is a block diagram of a small switch 200. Small switch 200 illustrates the small switches 102-132 of FIG. 1(*a*) in more detail. The small switch 200 is connected to, and communicates with, the processor 166 of the 64-port switch 100. The small switch 200 has sixteen ports 202. The small switch 200 further has a central memory 204, random access memory (RAM) 206, logic 208, and a connection 210 to processor 166. In one described embodiment, the small switch 200 is an application specific integrated circuit (ASIC), where the logic 208 is part of the ASIC hardware. However, other circuit types and other logic embodiments may also be used. All the ports 202 are capable of reading and writing to the memory simultaneously, which provides the small switch 200 with full non-blocking performance.

The central memory 204 has buffers managed by a list. The list tracks which buffers are free. The buffers are divided into several groups of buffers reserved for different purposes.

A fixed number of buffers are reserved for each port 202. Additionally, there is a pool of buffers shared among the ports. When the buffers reserved for a specific port are full, the shared pool of buffers can be used with that port, if any are free.

Further, in one embodiment there are eight virtual channels available. Any of the eight virtual channels can be used with any port. These virtual channels act to divide each physical port into eight different virtual sub-ports. Four of the virtual channels are reserved for special circumstances, such as communication between the small switches, transportation of multicast traffic through the fabric, and high priority data. Four of the virtual channels are used for general data flow. General data flow is the normal flow of data through the switch.

Within the buffers reserved for a specific port, a fixed number of buffers are reserved for each virtual channel. An additional pool of buffers is shared among all the virtual channels. Since, generally, data frames arriving at a small switch 200 from an external port do not have virtual channels, in some embodiments the buffers for external ports are not divided up between virtual channels. When a data frame is received at the small switch 200, the logic 208 of the small switch 200 determines which virtual channel carried the data frame to the small switch 200, and the data frame is sent to the buffers appropriate to that virtual channel.

The RAM 206 stores the routing table for the small switch. The routing table tells the small switch 200 through which port the data should be sent out. In one embodiment, the data's D_ID determines the port through which the data should be sent out. Thus, when data frames are to be sent from the small switch 200, the logic 208 of the small switch 200 determines the D_ID from the data frame and uses the routing table stored in RAM 206 to determine which port 202 to send the data out on. The small switch 200 then sends the data out through the appropriate port 202.

While the small switch 200 is described as a 16-port small switch, small switches with other port counts and data speeds can be used to form a large port count switch.

FIG. 2(*b*) is a flow chart 220 illustrating how the 64-port switch 100 creates routing tables for routing data frames through the 64-port switch 100. The processor 166 of the 64-port switch 100 programs routing tables for all the small switches 102-132 during initialization of the 64-port switch 100.

The processor 166 begins to create 222 the routing tables in the small switches 102-132 during initialization. For simplicity, and clarity of illustration, the creation of the routing tables is described with respect to entries for external connection 134 of small switch 102 of the 64-port switch 100. The processor 166 creates routing table entries for the other external connections of the 64-port switch 100 in the same manner.

The routing table entries for routing data frames within small switch 102 are created 224 first. These routing table entries correctly route data frames that enter the small switch 102 and are bound for an external destination device connected to the small switch 102 via connection 134. External connection 134 has one or more associated D_IDs (known as the "134 D_ID"). If an external connection, such as external connection 134, is an F_Port connected to a device, the external connection is associated with one D_ID. If an external connection is connected to a loop, such as an FL_Port, the external connection is associated with all the D_IDs of devices on that loop. If an external connection is an E_Port, connected to another switch, the external connection is associated with a set of D_IDs. The data frames may enter small switch 102 from one of the other external connections 136, 138, or 140, or from another small switch over one of the ISLs 142-164. The processor 166 creates entries in the routing table within small switch 102 that state that data frames with 134 D_ID are to be sent to the port associated with external connection 134. Thus, data frames received by small switch 102 and having a 134 D_ID are forwarded to the port associated with connection 134. The data frames are sent out the port, through external connection 134 to the proper destination.

Next, the processor 166 of the 64-port switch 100 creates 226 routing table entries for data frames with a 134 D_ID within the other small switches 110, 118, and 126 in the same column as small switch 102. Under the first horizontal, then vertical routing rules, data frames that arrive at the small switch 102 from other small switches in the same column are destined for an external destination device connected to small switch 102. This is because the vertical hop is the last hop before the data frame leaves the 64-port switch 100 for an external destination device. The processor 166 creates routing table entries in each of the small switches in the se column as small switch 102 for external connection 134 of small switch 102. These routing table entries indicate that data frames with the 134 D_ID are to be sent out ports connected to small switch 102. For example, small switch no includes a routing table indicating that any data frame with a D_ID for external connection 134 will be sent to the ports connected to ISLs 154 and 156. The other small switches 118 and 126 in the column also include routing table entries for vertical hops to external connection 134 at small switch 102 similar to the routing table in small switch 110. The routing table in small switch 118 stores, in association with D_ID 134, information indicating the data frame should be sent out ISLs 158 and 160. The routing table in small switch 126 stores, in association with D_ID 134, information indicating the data frame should be sent out ISLs 162 and 164.

Next, the processor 166 adds entries to the routing tables of other small switches 104, 106, and 108 in the same row as small switch 102. These entries correspond to sending data frames to external connection 134 of small switch 102. For data frames with D_IDs indicating those frames should be sent out external connection 134, the processor 166 creates entries in the routing tables of small switches 104, 106, and 108 indicating the data should be sent out ISLs 142 and 144, 146 and 148, or 150 and 152, respectively, to reach small switch 102. Under the routing rules of a first horizontal hop, then a second vertical hop, if a data frame is sent on a horizontal hop, it is the first hop after a small switch receives the data frame from an external source.

Finally, the processor 166 creates 230 routing table entries in the small switches in other rows for external connection 134 of small switch 102. Small switches 112, 114, and 116 send data frames bound for small switch 102 horizontally to small switch no. Thus, the processor 166 creates routing table entries in small switches 112, 114, and 116 indicating that data frames bound for D_ID 134 are sent out ports connected to small switch no.

This process is repeated 232 for each external connection of each small switch. In each small switch, the processor 166 creates routing table entries determining how data frames get to each destination connection through the 64-port switch 100. After all routing table entries have been created for every external connection of each small switch, the process is finished 234.

Figure 2C:
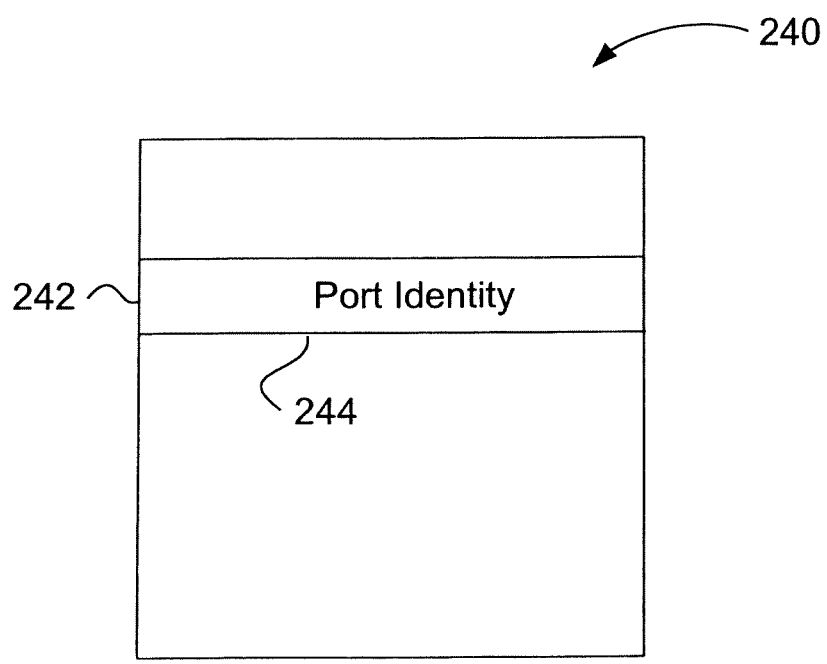
FIG. 2(c) is an illustration of a routing table.

FIG. 2(c) is an illustration of the routing table 240 created during initialization of the 64-port switch 100. Each D_ID is associated with an index 242 in the routing table 240. The index 242 is a memory address in the RAM 206 of the small switch. Each D_ID is associated with a memory address. Accordingly, the small switch uses the D_ID to find the proper index 242 in the routing table 240. The small switch looks up the index 242 in the routing table 240 and returns the identity of the port 244 associated with that D_ID. This is the port on which the data frame should be sent.

Overview of Data Flow

Figure 3:
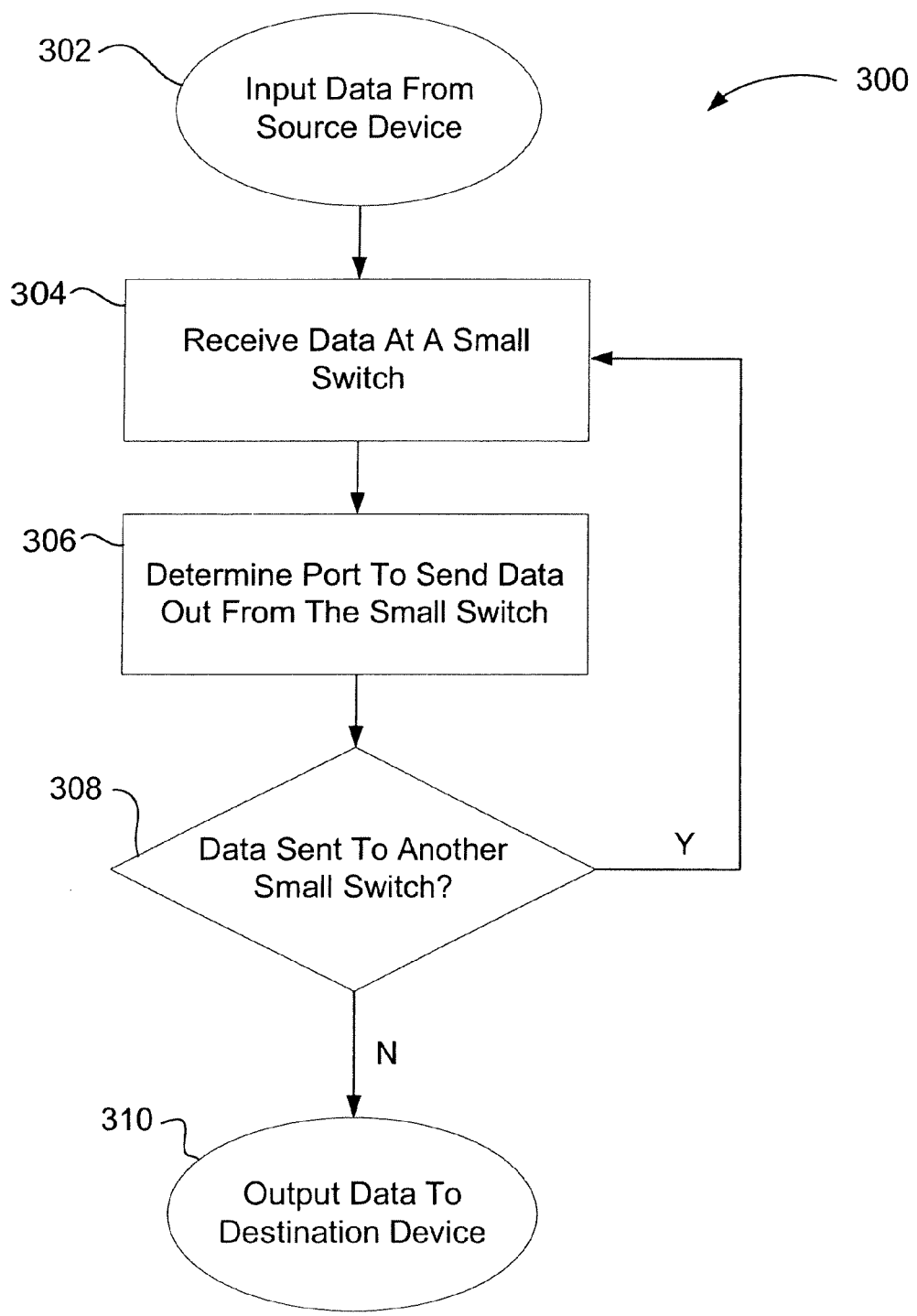
FIG. 3 is a flow chart describing how data travels through the switch of FIG. 1(a).

FIG. 3 is a flow chart describing how data travels through the switch 100 of FIG. 1(a). Data initially enters 302 the switch 100 from an external source device. The data is received 304 at a small switch through the port connected to the external source device.

The small switch determines 306 what port through which the data should be sent out. To determine which port the data should be sent through, the small switch first reads the D_ID from the received data frame. Once the D_ID is retrieved from the data frame, the small switch retrieves the appropriate port through which to send the data frame from the routing table. As described above with respect to FIG. 2(b), the routing table provides the proper ports for the first small switch to send the data out. The small switch then sends the data out through the correct port;

From any small switch, the data may be sent 308 to another small switch in the 64-port switch 100, or to the external destination device. If the small switch sends the data out a port connected to another small switch, the process of receiving the data 304 and determining 306 which port to send the data out is repeated in the next small switch.

If the small switch sends the data out through a port that is connected to the external destination device, the external destination device receives 310 the data and the process ends.

Thus, the process is the same if the small switch 200 receives the data from an external source device or from another small switch 200. The process is also the same if the small switch 200 sends the data to another small switch 200 or to an external destination device. When the data arrives at the small switch 200, the D_ID is determined. The small switch 200 uses the D_ID with the routing table to determine which port to send the data out. The small switch 200 will then send the data out that port, which can be connected to another small switch 200 or to the external destination device.

As an example, data travels from an external source device connected to small switch 102 to an external destination device connected to small switch 122. According to the routing rules, the data should be sent from small switch 102 to small switch 106 (the horizontal hop), and then to small switch 122 (the vertical hop), which sends the data to the external destination device. The external source device inputs 302 data to the 64-port switch 100. Small switch 102 within the 64-port switch receives the data from the external source device through the external port that is connected to the external source device.

Small switch 102 determines the D_ID of the data. The small switch 102 uses the D_ID with the routing table to determine the correct port through which to send the data out. The routing table stores information that small switch 102 should send the data out through one or both of the ports connected to ISLs 146 and 148. Small switch 102 then sends the data out over one or both of ISLs 146 and 148.

Small switch 106 receives the data from small switch 102. Small switch 106 then determines the D_ID of the data. The D_ID is used with the routing tables to determine the correct port through which to send the data out. The routing table stores information that small switch 106 should send the data out through the port or ports connected to small switch 122 by an ISL or ISLs. Small switch 106 then sends the data out through the port or ports.

Small switch 122 receives the data from small switch 106. Small switch 122 then determines the D_ID of the data. The D_ID is used with the routing tables to determine the correct port to send the data out on. The routing table stores information that small switch 122 should send the data out through the port connected to the external destination device. Small switch 122 sends the data out to the external destination device.

FIGS. 4 through 7 illustrate examples of other embodiments of the present invention.

128-Port Switch

Figure 4:
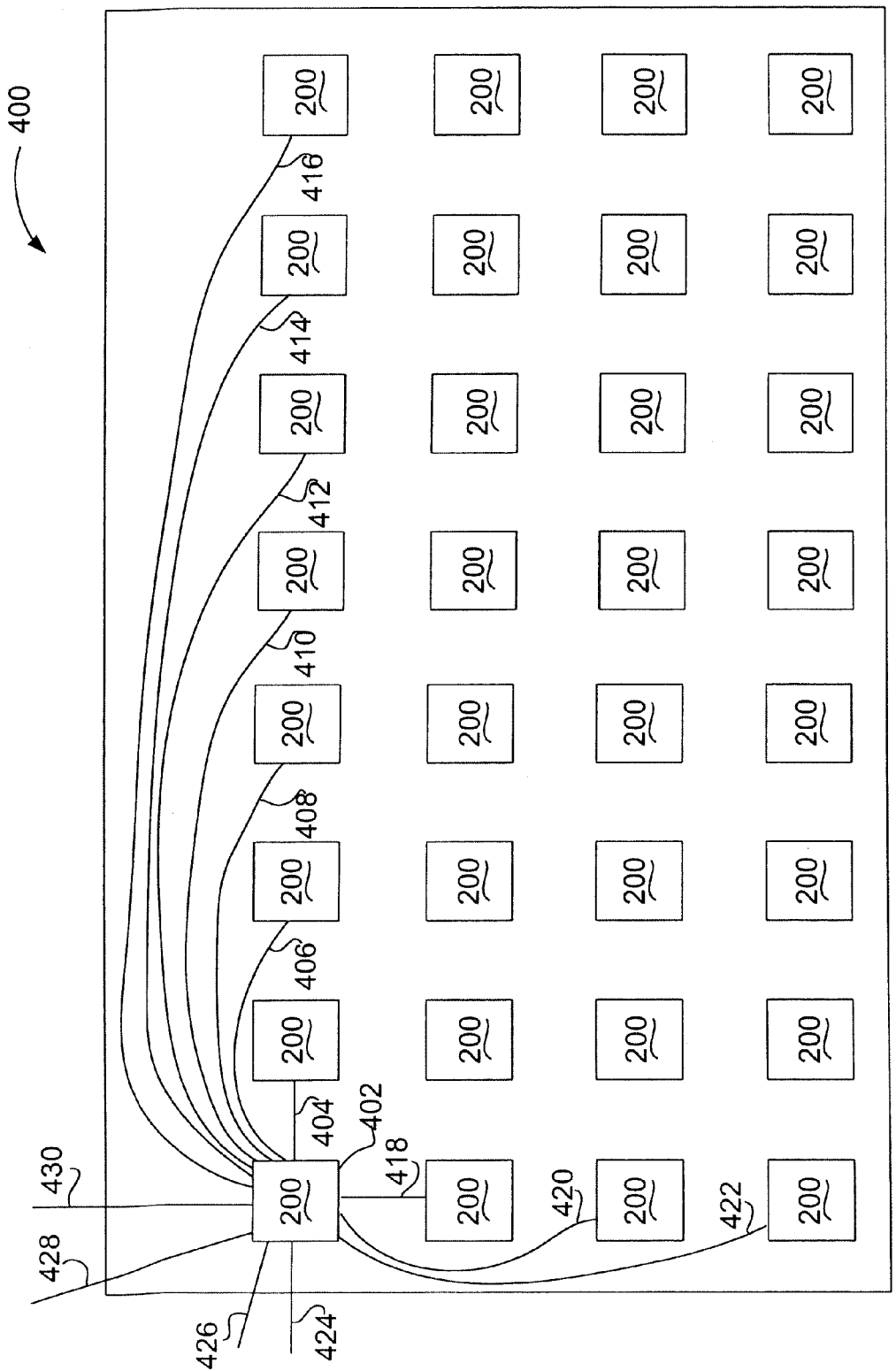
FIG. 4 is a block diagram of a 128-port switch in accordance with the present invention

FIG. 4 is a block diagram of a 128-port switch 400 in accordance with the present invention. The 128-port switch comprises thirty-two of the small 16-port switches 200 and a processor (not shown) that is connected to and communicates with each of the small switches 200. The small switches 200 are arranged in four rows and eight columns. Each row includes eight of the small switches 200, and each column includes four of the small switches 200. Each small switch 200 is directly connected to every other small switch in the same row through one port, and is also directly connected to every other small switch in the same column through one port. Thus, each small switch 200 has one ISL with every other small switch in the same row and one ISL with every other switch in the same column. Further, each small switch 200 has four external ports that devices external to the 128-port switch 400 may be connected. Thus, out of the 16-ports in each small switch 200, seven ports are ports that are connected to form ISLs with the other small switches in the same row, three ports are ports that are connected to form ISLs with the other small switches in the same column, and four are external ports that are connectable to devices external to the switch 400. Two ports are unused.

All of the small switches 200 are similarly connected. Small switch 402 illustrates how the rest of the small switches 200 are arranged and connected. Small switch 402 is in a row of eight small switches. One port of small switch 402 is connected to one port of each of the other small switches in the row. Thus, ISLs 404, 406, 408, 410, 412, 414, 416 connect small switch 402 to the other small switches in the row. Small switch 402 is also in a column of four small switches. One port of small switch 402 is connected to one port of each of the other small switches in the column. Thus, ISLs 418, 420, and 422 connect small switch 402 to the other small switches in the column. Finally, four ports are connectable to external devices through connections 424, 426, 428, and 430.

Each of the other small switches 200 in the 128-port switch 400 is similarly connected to each other small switch in the same row and each other small switch in the same column. Because there are thirty-two small switches 200, and each small switch has four external ports, the switch 400 has one hundred twenty-eight total external ports.

There is a set of routing rules for data frames traveling through the 128-port switch 400 from an external source device (not shown in FIG. 4) to an external destination device (also not shown in FIG. 4). The routing rules are reflected in routing tables contained in the small switches' 200 hardware. These routing tables are created similarly to the routing tables for the 64-port switch 100, as described above with respect to FIG. 2(b). In general, the D_ID in received data frames are used to retrieve the correct routing for the data frame from the routing table.

When data flows through the 128-port switch 400, the data frame enters a first small switch through one of the four externally connected ports. In one embodiment, the data frame is first sent horizontally to reach the column containing the small switch connected to the external destination device, then sent vertically within the column to reach the small switch connected to the external destination device. Under such routing rules there is only one path between any two small switches.

The described 128-port switch 400 provides the advantage of allowing modular construction. Since each small switch in a row is directly connected to each other small switch in the row, a column of four small switches can be removed and the remaining small switches in the 128-port switch 400 will still function. For example, if the third column of FIG. 4 is removed, the 128-port switch 400 becomes a 112-port switch, but otherwise operates in the same manner. When data enters one of the remaining small switches connected to an external source device, the data still travels over a horizontal hop, if necessary, and a vertical hop, if necessary, and leaves the small switch connected to the external destination device. Essentially, instead of a switch 400 having eight columns of four small switches, the switch 400 has seven columns of four small switches, but operates in the same manner. Similarly, if a row is removed, the switch 400 then has eight columns of three small switches, but operates in the same manner. Some embodiments of the 128-port switch 400 have a modular construction that allows removal of rows, and other embodiments have a modular construction that allows removal of columns.

128-Port Switch, Non-Blocking at 1 Gbps

Figure 5A:
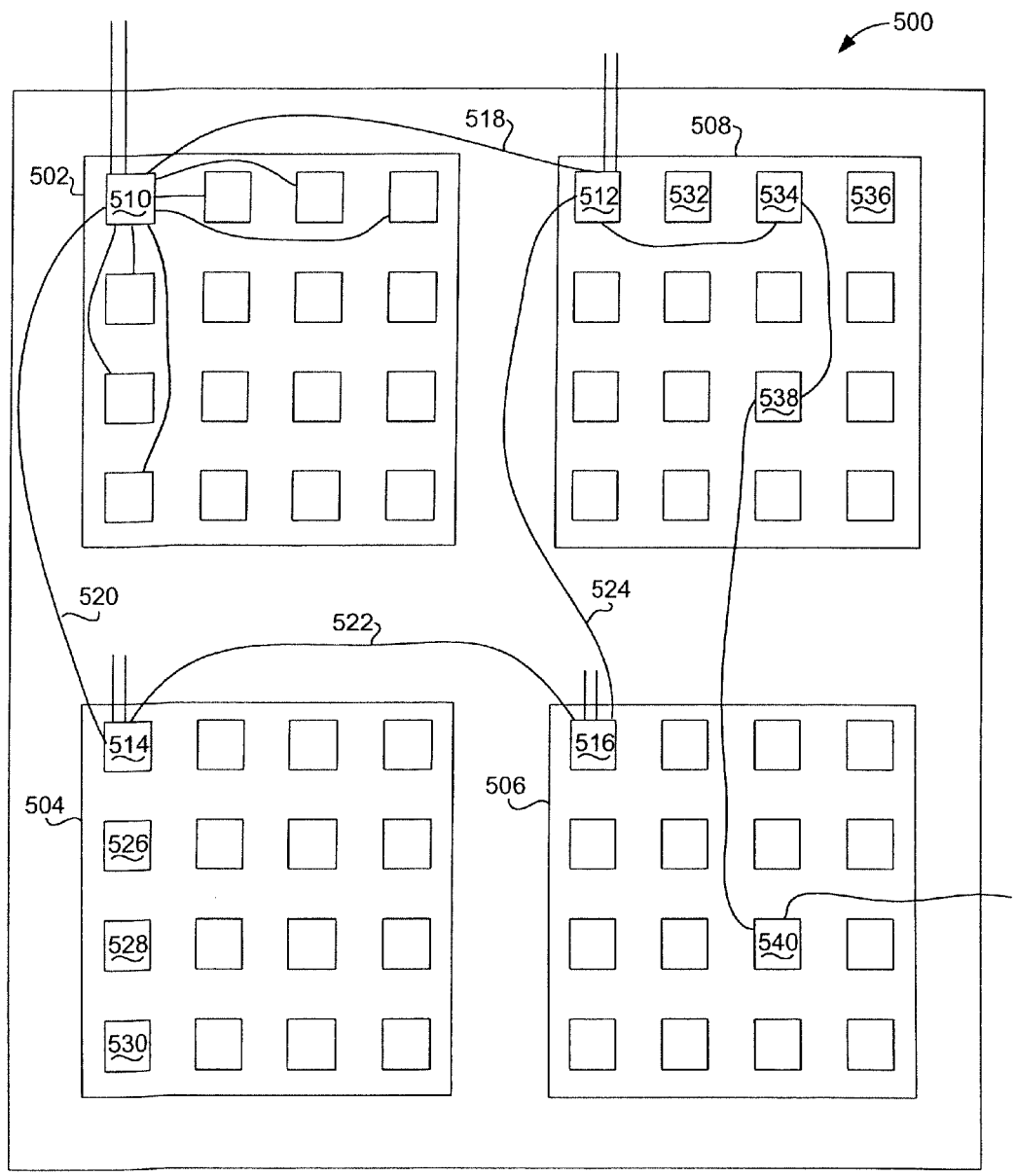
FIG. 5(a) is a block diagram of another 128-port switch in accordance with the present invention.

FIG. 5(a) is a block diagram of a 128-port switch 500 that is non-blocking at 1 Gbps. The 128-port switch 500 of FIG. 5(a) includes sixty-four small switches 200. In the embodiment shown in FIG. 5(a), the small switches are arranged into four sets 502, 504, 506, and 508 of sixteen small switches each. The small switches within each set 502, 504, 506, and 508 are arranged in four rows and four columns. The sets 502, 504, 506, and 508 each contain ISLs connecting the small switches in a similar manner to the ISLs of 64-port switch 100 shown in FIG. 1(a). Each small switch is connected to every other small switch within the set in the same row by two ISLs, and each small switch is connected to every other small switch within the set in the same column by two ISLs (for clarity, only one of the ISLs connecting small switches within sets is shown, instead of the two ISLs). Each small switch in a set is also connected to two corresponding small switches in two other sets. Each connection between sets is by one ISL. Each small switch in a set is connected to the small switches in the same two other sets. Thus, small switch 510 has a port connected to a port of small switch 512 by an ISL 518 and a port connected to a port of small switch 514 by an ISL 520. Similarly, small switch 516 has a port connected to a port of small switch 514 by an ISL 522 and a port connected to a port of small switch 512 by an ISL 524.

In the 128-port switch 500 of FIG. 5(a), each small switch 200 only has two ports connectable to external devices. Thus, it takes sixty-four small switches to make a 128-port switch, instead of only thirty-two switches, as in the 128-port switch 400 of FIG. 4.

In one embodiment, the 128-port switch 500 is made of four of the 64-port switches 100 described above. Each of the sets 502, 504, 506, and 508 of sixteen small switches is a 64-port switch 100. Within each of the four 64-port switches 100, two of the external ports of each small switch are connected to form ISLs with small switches in two of the other 64-port switches 100. That leaves each small switch with two ports available to connect to external devices.

The 128-port switch 500 of FIG. 5(a) has a set of routing rules for data frames traveling through the 128-port switch 500 from an external source device (not shown) to an external destination device (also not shown). These routing rules are reflected in routing tables contained in the small switches' 200 hardware. The routing tables are created similarly to the routing tables for the 64-port switch 100, as described above with respect to FIG. 2(b). In general, the D_ID in received data frames are used to retrieve the correct routing for the data frame from the routing table.

When data flows through the 128-port switch 500 of FIG. 5(a), the data frame enters a first small switch through one of the two externally connected ports. In one embodiment, the data is first sent horizontally from the small switch in one set of switches to a corresponding small switch in a second set of small switches. Second, the data is sent horizontally within the set of switches to reach the column that corresponds to the column containing the small switch connected to the external destination device. Third, the data is sent vertically within set of switches to reach the row that corresponds to the row containing the small switch connected to the external destination device. Fourth and finally, the data is sent vertically from the small switch in one set of switches to a corresponding small switch in another set of switches, which is connected to the external destination device. Any or all of the four steps are omitted if they are unnecessary. Under such routing rules there is only one path between any two small switches.

An example of these routing rules is data entering small switch 510 from an external device and is bound for an external destination device connected to small switch 540. First, the data is sent horizontally from small switch 510 in set 502 to the corresponding small switch 512 in set 508. Second, the data is sent horizontally within set 508 from small switch 512 to small switch 534. Third, the data is sent vertically within set 508 from small switch 534 to small switch 538. Finally, the data is sent vertically from small switch 538 in set 508 to small switch 540 in set 506, which in turn sends the data to the external destination device.

Figure 5B:
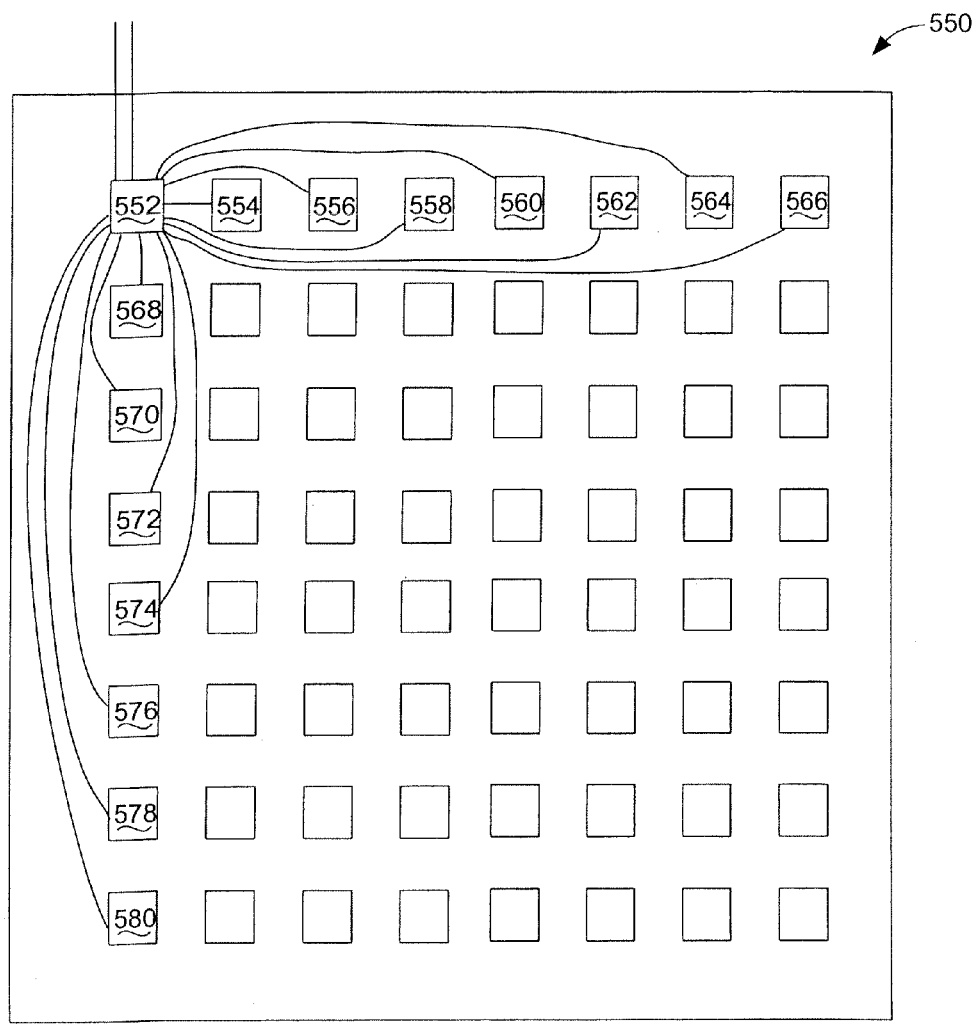
FIG. 5(b) is a block diagram of yet another 128-port switch in accordance with the present invention.

FIG. 5(b) is a block diagram of another 128-port switch 550 that is non-blocking at 1 Gbps. The 128-port switch 550 of FIG. 5(b) includes sixty-four small switches 200 and a processor (not shown) that is connected to and interacts with each of the small switches. In the embodiment shown in FIG. 5(b), the small switches are arranged into eight rows and eight columns of eight small switches each. Each small switch 200 is connected to every other small switch in the same row by one ISL, and each small switch 200 is connected to every other small switch in the same column by one ISL. Each small switch also has two external ports, for a total of 128 external ports. Thus, small switch 552 has ports connected to one port each of small switches 554-566 in the same row by ISLs and ports connected to one port each of small switches 568-580 in the same column by ISLs. Small switch 552 has two external ports for connection to external devices. Each of the small switches in the 128-port switch 550 is similarly connected.

The 128-port switch 550 has routing rules similar to the 64-port switch 100, as described above. Also like the 64-port switch 100, the data frames travel through the 128-port switch 550 by first going on a horizontal "hop" then a vertical "hop." Also, in some embodiments, the 128-port switch 550 is modular, and is constructed so that any column can be removed, and the rest of the switch 550 can operate normally.

100-Port Switch

Figure 6:
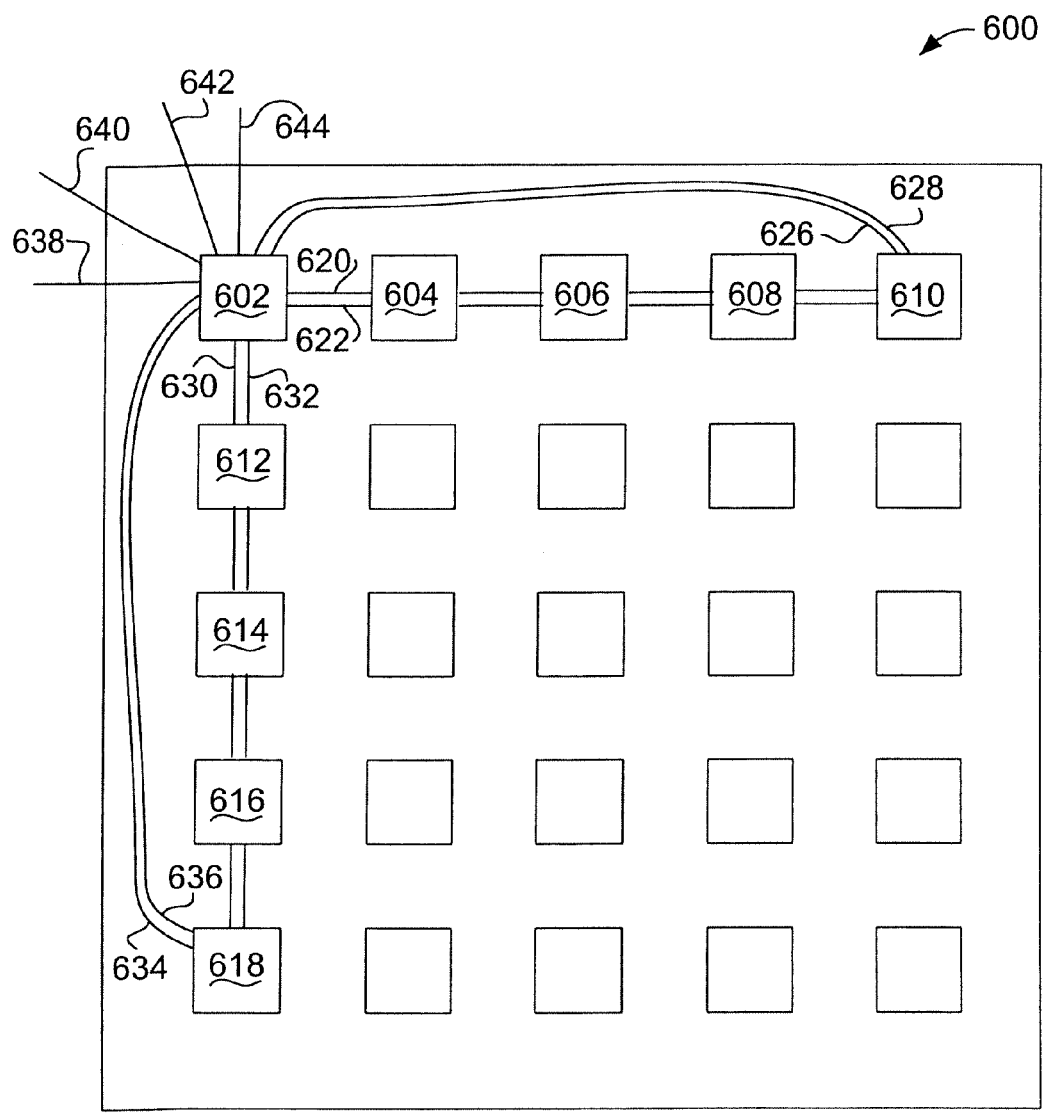
FIG. 6 is a block diagram of a 100-port switch in accordance with the present invention.

FIG. 6 is a block diagram of a 100-port switch 600 in accordance with the present invention. The 100-port switch 600 of FIG. 6 comprises twenty-five small switches 200 and a processor (not shown) that is connected to and interacts with each of the small switches 200. In the embodiment shown in FIG. 6, the small switches are arranged in five rows and five columns. Each row and column includes five of the small switches. Each small switch is directly connected to two other small switches in the same row through two ports, and is also directly connected to two other small switches in the same column through two ports. Each small switch also has four ports connectable to external devices. Thus, since the switch 600 has twenty-five small switches, and each small switch has four externally connectable ports, the switch 600 is a 100-port switch.

In the first row of the 100-port switch 600, small switch 602 is connected to small switch 604 by two ISLs 620 and 622, and to small switch 610 by two ISLs 626 and 628. Small switch 602 is also connected to small switch 612 by two ISLs 630 and 632, and to small switch 618 by two ISLs 634 and 636. Finally, small switch has four ports that are connectable to external devices through connections 638, 640, 642, and 644.

Small switch 602 is not directly connected to every other small switch in the same row or column. Small switch 602 is not directly connected to small switches 606 or 608. Similarly, small switch 602 is not directly connected to small switches 614 or 616.

There is a set of routing rules for data frames traveling through the 100-port switch 600 from an external source device (not shown) to an external destination device (also not shown). The routing rules are reflected in routing tables contained in the small switches' hardware. These routing tables are created similarly to the routing tables for the 64-port switch 100, as described above with respect to FIG. 2(b). In general, the D_ID in received data frames are used to retrieve the correct routing for the data frame from the routing table.

When data flows through the 100-port switch 600, the data frame enters a first small switch from an external source device through one of the two externally connected ports. In one embodiment, the data is first sent horizontally within a row of small switches to reach the column containing the small switch connected to the external destination device. Next, the data is sent vertically within a column of small switches to reach the small switch connected to the external destination device.

Since each small switch is not directly connected to every other small switch in the same row, the data may have to be sent through multiple small switches within the row. The routing table stores routing rules that ensure that the data is sent through as few other small switches as possible. Thus, for data traveling from small switch 602 to small switch 606, the data is first sent to small switch 604, which then sends the data to small switch 606. For data traveling from small switch 602 to small switch 608, the data is first sent to small switch 610, which then sends the data to small switch 608.

Similarly, since each small switch is not directly connected to every other small switch in the same column, the data may have to be sent through multiple small switches in the column. The routing table stores routing rules that ensure that the data is sent through as few other small switches as possible. Thus, for data traveling from small switch 602 to small switch 614, the data is first sent to small switch 612, which then sends the data to small switch 614. For data traveling from small switch 602 to small switch 616, the data is first sent to small switch 618, which then sends the data to small switch 616.

64-Port Switch, Non-Blocking at 2 Gbps

Figure 7:
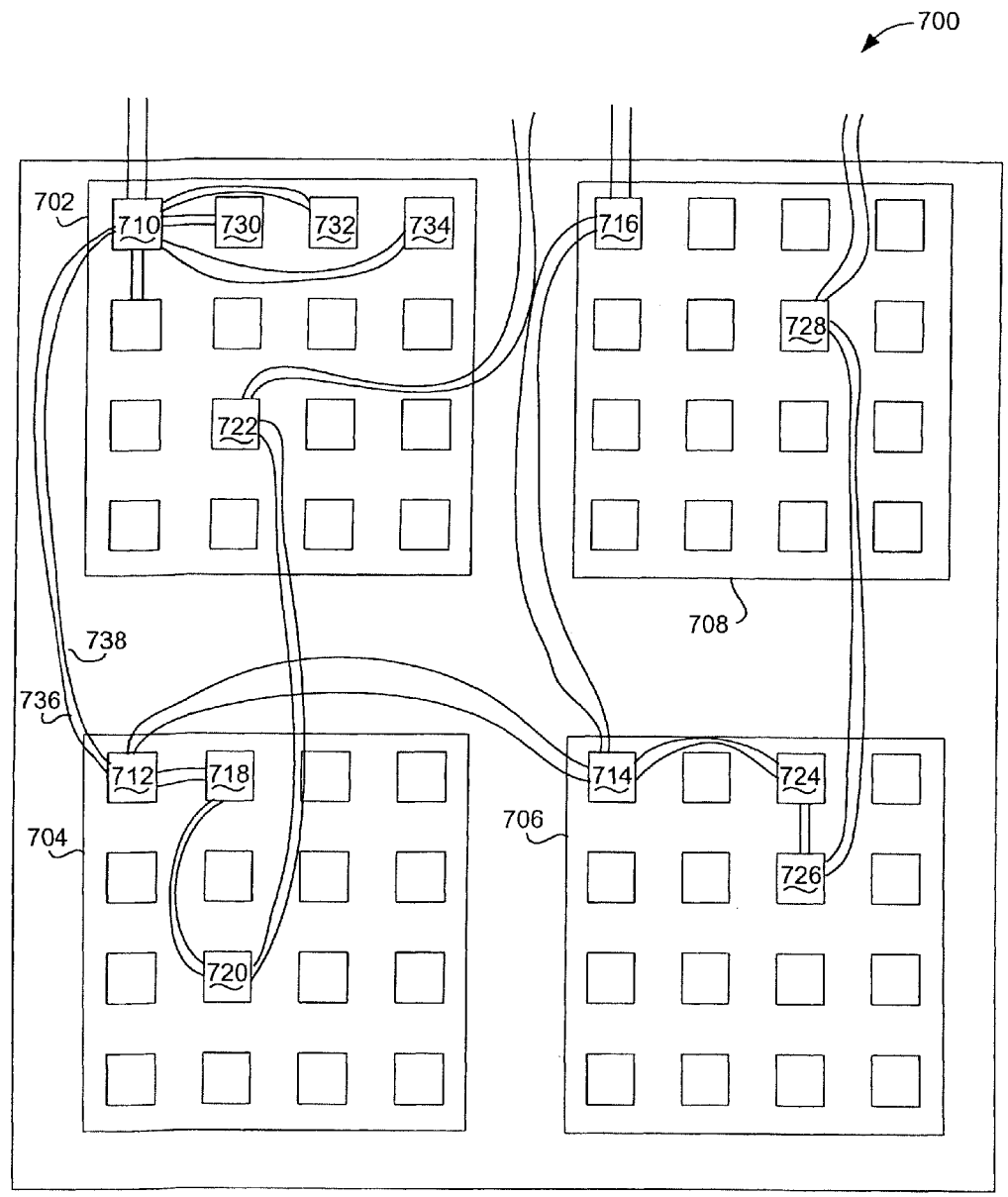
FIG. 7 is a block diagram of a 64-port switch that is non-blocking at a data rate of 2 Gbps.

FIG. 7 is a block diagram of a 64-port switch 700 that is non-blocking at a data rate of 2 Gbps. The 64-port switch 700 of FIG. 7 comprises sixty-four small switches 200 and a processor (not shown) that is connected to and interacts with each of the small switches 200. In the embodiment shown in FIG. 7, the small switches are arranged into four sets 702, 704, 706, and 708 of sixteen small switches each. The small switches within each set 702, 704, 706, and 708 are arranged in four rows and four columns. The sets 702, 704, 706, and 708 each contain ISLs connecting the small switches in a similar manner to the ISLs of 64-port switch 100 shown in FIG. 1(a). Each small switch is connected to every other small switch within the set in the same row by two ISLs, and each small switch in connected to every other small switch within the set in the same column by two ISLs. Each small switch in sets 702 and 708 is also connected by two ISLs to one corresponding small switch in sets 704 and 706, respectively. Each small switch in set 704 is connected to one corresponding small switch in set 702 by two ISLs and is also connected to one corresponding small switch in set 706 by two ISLs. Similarly, each small switch in set 706 is connected to one corresponding small switch in set 704 by two ISLs and is also connected to one corresponding small switch in set 708 by two ISLs. There are no direct connections from small switches in set 702 to small switches in set 708. Each small switch in sets 702 and 708 have two ports connectable to external devices. The small switches in sets 704 and 706 have no ports connectable to external devices.

Thus, small switch 710 has two ports connected to every other small switch within the set in the same row, small switches 730, 732, and 734, by two ISLs. Small switch 710 also has two ports connected to every other small switch within the set in the same column by two ISLs. Small switch 710 also has two ports connected to two ports of small switch 712 by two ISLs 736 and 738. Small switch 712 in turn has two ports connected to every other small switch within the set in the same row, every other small switch within the set in the same column, and to small switch 714. Small switch 714 has two ports connected to every other small switch within the set in the same row, every other small switch within the set in the same column, and to small switch 716.

There is a set of routing rules for data frames traveling through the 64-port switch 700 of FIG. 7 from an external source device (not shown) to an external destination device (also not shown). The routing rules are reflected in routing tables contained in the small switches' 200 hardware. These routing tables are created similarly to the routing tables for the 64-port switch 100, as described above with respect to FIG. 2(b). In general, the D_ID in received data frames are used to retrieve the correct routing for the data frame from the routing table.

When data flows through the 64-port switch 700 of FIG. 7, the data frame enters a first small switch in a first set of small switches through one of the two externally connected ports. In some embodiments, if the data's destination is an external device connected to a small switch also in the first set of small switches, the data follows the same horizontal and vertical hops detailed in the discussion of the 64-port switch 100 of FIG. 1(a). The data is first sent horizontally to reach the column containing the small switch connected to the external destination device, then sent vertically within the column to reach the small switch connected to the external destination device.

If the data's destination is an external device connected to a small switch in the other set of small switches with external ports, the data is first sent from a first set of small switches that includes the first small switch to a second set of small switches connected to the first set.

The data is then sent from the second set of small switches to a third set of small switches. In some embodiments, within the third set of small switches, the data follows the same horizontal and vertical hops detailed in the discussion of the 64-port switch 100 of FIG. 1(a). The data is first sent horizontally to reach the column that corresponds to the column containing the small switch connected to the external destination device, then sent vertically within the column to reach the small switch that corresponds to the small switch connected to the external destination device. Finally, the data is sent from the small switch in the third set of small switches to the small switch in the fourth set of small switches that is connected to the external destination device.

As an example, data is to flow from an external source device connected to small switch 710 in set 702 to an external destination device connected to small switch 728 in set 708. The data enters small switch 710 from the external source device. Small switch 710 sends the data to corresponding small switch 712 in set 704. Small switch 712 sends the data to corresponding small switch 714 in set 706. Within set 706, the data is sent to the proper row and column. Small switch 714 sends the data horizontally to small switch 724, which then sends the data vertically to small switch 726. The location of small switch 726 within set 706 corresponds to the location of small switch 728 within set 708. Small switch 726 sends the data to small switch 728 in set 708. Finally, small switch 728 sends the data to the external destination device.

Thus, when data travels from set 702 to set 708, set 706 performs the horizontal and vertical hops to send the data to the small switch location within the set 706 that corresponds to the small switch location within set 708 that is connected to the external destination device.

When data travels from an external source device connected to a small switch in set 708 to an external destination device connected to a small switch in set 702, a similar path is used. For example, data is to flow from an external source device connected to small switch 716 in set 708 to an external destination device connected to small switch 722 in set 702. The data enters small switch 716 from the external source device. Small switch 716 sends the data to corresponding small switch 714 in set 706. Small switch 714 sends the data to corresponding small switch 712 in set 704. Within set 704, the data is sent to the proper row and column.

Small switch 712 sends the data horizontally to small switch 718, which then sends the data vertically to small switch 720. The location of small switch 720 within set 704 corresponds to the location of small switch 722 within set 702. Small switch 720 sends the data to small switch 722 in set 702. Finally, small switch 722 sends the data to the external destination device. Thus, when data travels from set 708 to set 702, set 704 performs the horizontal and vertical hops to send the data to the small switch location within the set 706 that corresponds to the small switch location within set 702 that is connected to the external destination device.

When data travels from an external source device connected to a small switch in set 702 or 708 to an external destination device connected to a small switch in the same set, the data travels over a horizontal "hop" then a vertical "hop," similar to the 64-port switch 100 described above. For example, data is to flow from an external source device connected to small switch 710 in set 702 to an external destination device connected to small switch 722 also in set 702.

Small switch 710 sends the data horizontally to small switch 730. Small switch 730 then sends the data vertically to small switch 722 (ISLs between small switch 730 and small switch 722 are not shown). Finally, small switch 722 sends the data to the external destination device.

Alternative routing rules can also be used. For example, when data flows from a small switch in set 702 to a small switch in set 708, the horizontal and vertical hops could be performed within set 704 rather than within set 706. In such a case, when data flows from a small switch in set 708 to a small switch in set 702, the horizontal and vertical hops would be performed within set 706 rather than within set 704.

In one embodiment, each port of each small switch is capable of operating at either 1 Gbps or 2 Gbps. Each of the internal ports operates at 2 Gbps. Each external port operates at either 1 Gbps or 2 Gbps, depending on the speed of the external device connected to the external port. The 64-port switch 700 is non-blocking at both 1 Gbps and 2 Gbps.

The 64-port switch 700 shown in FIG. 7 has the advantage of being non-blocking at both 1 Gbps and 2 Gbps since, at most, 4 Gbps enters a small switch from the external source devices connected to a small switch. This is because the small switch can have two external ports, each operating at 2 Gbps, for a maximum total input data rate of 4 Gbps. Since each small switch is connected to the other small switches in the same row within the same set by two ports, the other small switches in the same column within the same set by two ports, and a corresponding small switch in another set by two ports, and each of these ports operates at 2 Gbps, the ports are capable of sending the full 4 Gbps.

Thus, for example, two external source devices are connected to small switch 710, each sending 2 Gbps of data. The data from the two external source devices is to be sent to two external destination devices, each connected to small switch 728. The full maximum data rate of 4 Gbps can be received at small switch 710 from the two external source devices and sent out from small switch 728 to the four external destination devices without congestion. Small switch 710 receives the maximum 4 Gbps from two external source devices. The 4 Gbps of data is first sent from small switch 710 to small switch 712. Since there are two ports connecting small switches 710 and 712, each operating at 2 Gbps, the full 4 Gbps can be sent without congestion. The 4 Gbps of data is next sent from small switch 712 to small switch 714. Since there are two ports connecting small switches 712 and 714, each operating at 2 Gbps, the full 4 Gbps can be sent without congestion. The 4 Gbps of data is next sent horizontally from small switch 714 to small switch 724, the horizontal hop. Since there are two ports connecting small switches 714 and 724, each operating at 2 Gbps, the full 4 Gbps can be sent without congestion. The 4 Gbps of data is next sent vertically from small switch 724 to small switch 726, the vertical hop. Again, since there are two ports connecting small switches 724 and 726, each operating at 2 Gbps, the full 4 Gbps can be sent without congestion. The 4 Gbps of data is next sent from small switch 726 to small switch 728. Again, since there are two ports connecting small switches 726 and 728, each operating at 2 Gbps, the full 4 Gbps can be sent without congestion. Finally, from small switch 728, the 4 Gbps of data is sent to the two external destination devices.

While several embodiments of a large port count switch are described above, many other alternatives exist. Other embodiments of switches comprising a plurality of small switches may be used, with differing speeds and numbers of ports. Other embodiments of small switches used in the large port-count switch may be used. The present invention is intended to embrace all such alternatives, modification and variations as fall within the spirit and scope of the appended claims and equivalents.

We claim:

1. A switch, comprising:
   a plurality of small switches, each small switch including:
     a routing table memory including a routing table;
     a data memory;
     a plurality of ports; and
     logic operable to retrieve from the routing table stored in the routing table memory an identity of a port through which to send data received at the small switch; and
   a processor connected to each of the plurality of small switches,
   wherein each small switch is connected to a subset of the plurality of small switches via internal ports which comprise at least a subset of the plurality of ports,
   wherein at least a subset of the plurality of small switches are each connectable to an external device via external ports which comprise a subset of the plurality of ports,
   wherein each small switch cannot operate as a stand-alone element,
   wherein the processor creates entries in the routing table in each of the plurality of small switches, and
   wherein the logic is further operable to determine the destination of the data received at the small switch and retrieve the identity of a port associated with the destination in the routing table through which to send data received at the small switch.

2. The switch of claim 1, wherein the switch is a Fibre Channel switch.

3. The switch of claim 1, wherein each of the plurality of small switches is a small Fibre Channel switch.

4. The switch of claim 1, wherein the switch is non-blocking.

5. The switch of claim 1, wherein the small switches are non-blocking.

6. The switch of claim 5, wherein all of the plurality of ports within a small switch are capable of simultaneously operating at a maximum data rate without interfering with each other.

7. The switch of claim 1, wherein the plurality of ports comprises sixteen ports.

8. The switch of claim 1, wherein data travels through the switch from a source to a destination on a predetermined path.

9. A method for routing data from a source device through a switch, the switch comprising a plurality of small switches, each comprising a routing table memory including a routing table, a data memory and a plurality of ports, and being connected to a plurality of other small switches via at least a subset of the plurality of ports, and a processor connected to each of the plurality of small switches, wherein at least a subset of the plurality of small switches are each connectable to an external device via a subset of the plurality of ports and wherein each small switch cannot operate as a stand-alone element, the method comprising:
   the processor sending at least one routing table entry to each of the plurality of small switches, the entry comprising a destination and a port identity associated with the destination;
   each of the small switches storing the routing table entry in the routing table in the memory of the small switch;
   receiving the data from the source device at a first small switch of the plurality of small switches;
   at the first small switch, determining the destination of the data;
   at the first small switch, determining from the destination of the data an identity of a first port, connected to a second port in a second small switch, through which the data should be sent from the first small switch to the second small switch; and
   sending the data from the first small switch to the second small switch via the first port and the second port;
   at the second small switch, determining the destination of the data;
   at the second small switch, determining from the destination of the data an identity of a third port through which the data should be sent from the second small switch; and
   sending the data from the second small switch via the third port, wherein the first small switch determines the identity of the first port by retrieving the first port from the routing table, the first port being associated with the destination of the data in the routing table.

* * * * *